Patented Jan. 26, 1932

1,843,080

UNITED STATES PATENT OFFICE

RICHARD L. DAUBER, OF AKRON, OHIO, ASSIGNOR TO THE XYLOS RUBBER COMPANY, OF AKRON, OHIO, A CORPORATION OF OHIO

CRACKER REFEEDING DEVICE

Application filed December 18, 1929. Serial No. 414,920.

This invention relates to means for breaking up scrap material into pieces below a desired size. It more particularly relates to means operated in conjunction with a scrap rubber cracker mill for automatically refeeding pieces of scrap rubber above a determined size back into the cracker mill to reduce them to or below the determined size.

In the reclaiming of rubber it is customary to remove all metal from the rubber by suitable means and then to pass the scrap rubber through a cracker mill which is a mill with corrugated rolls whereby the rubber is broken up into small pieces. The rubber is then further broken up by passing through a hogger. From the hogger it is taken to tanks which remove all fabric therefrom and which devulcanize the rubber. Other steps follow to complete the reclaiming of the rubber, however, in passing through the cracker mill only once the scrap rubber is quite often not reduced sufficiently in size to be handled in the hogger. This has necessitated that an operator watch the size of the rubber pieces issuing from the cracker mill and that he refeed to the cracker mill any pieces above a determined size.

It is an object of this invention to provide automatic means for refeeding the pieces of scrap rubber which are too large for the hogger back into the cracker mill.

A further object of the invention is to provide cracker refeeding means which can be adjusted to control the size of the rubber pieces passing therefrom.

The above and other objects are attained by the apparatus illustrated in the accompanying drawings and described below, it being understood that the invention is not limited to the exact embodiment thereof shown and described.

Figure 1:
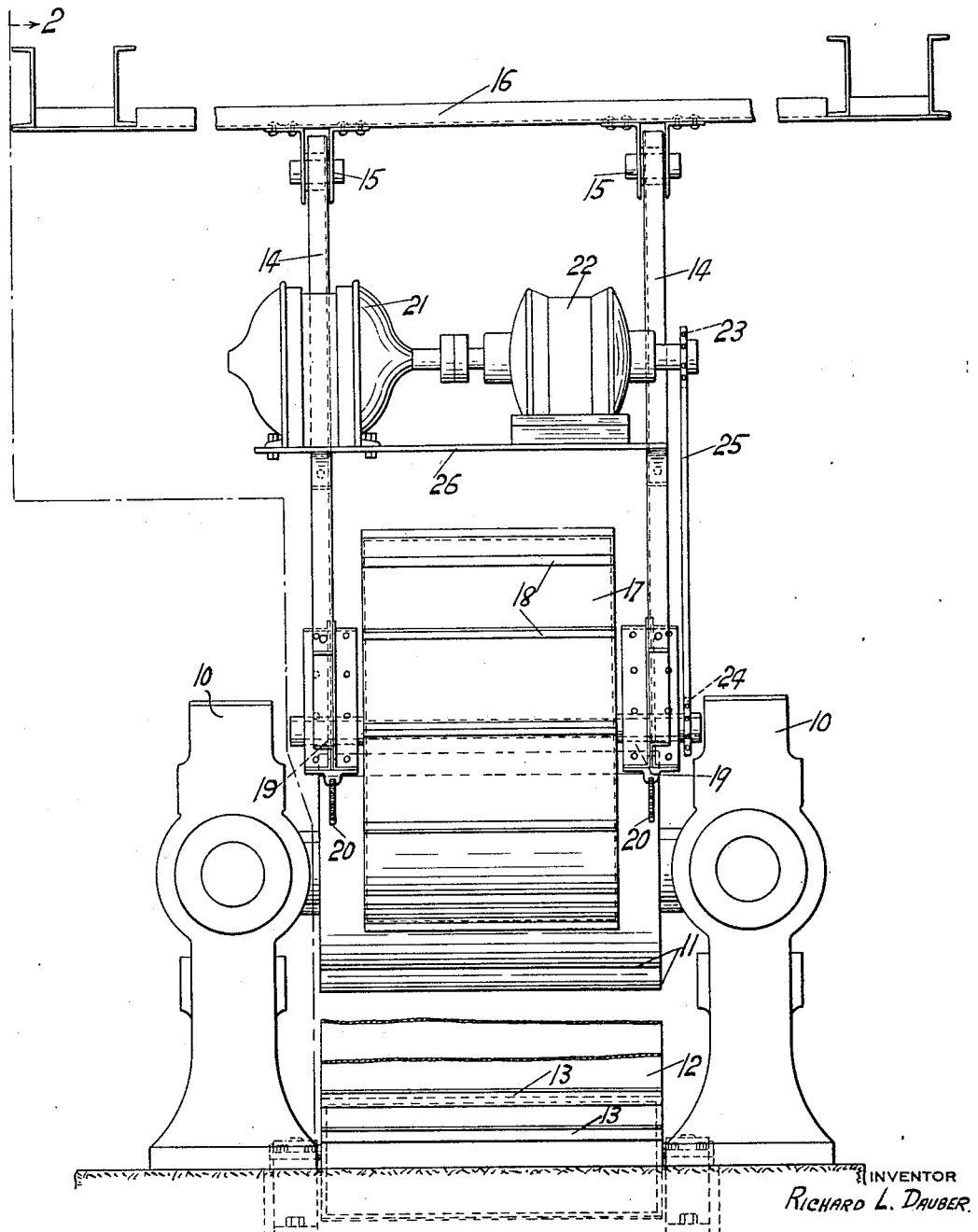
Figure 1 is a rear elevation of a cracker mill equipped with the refeeding device embodying the invention.
Figure 2:
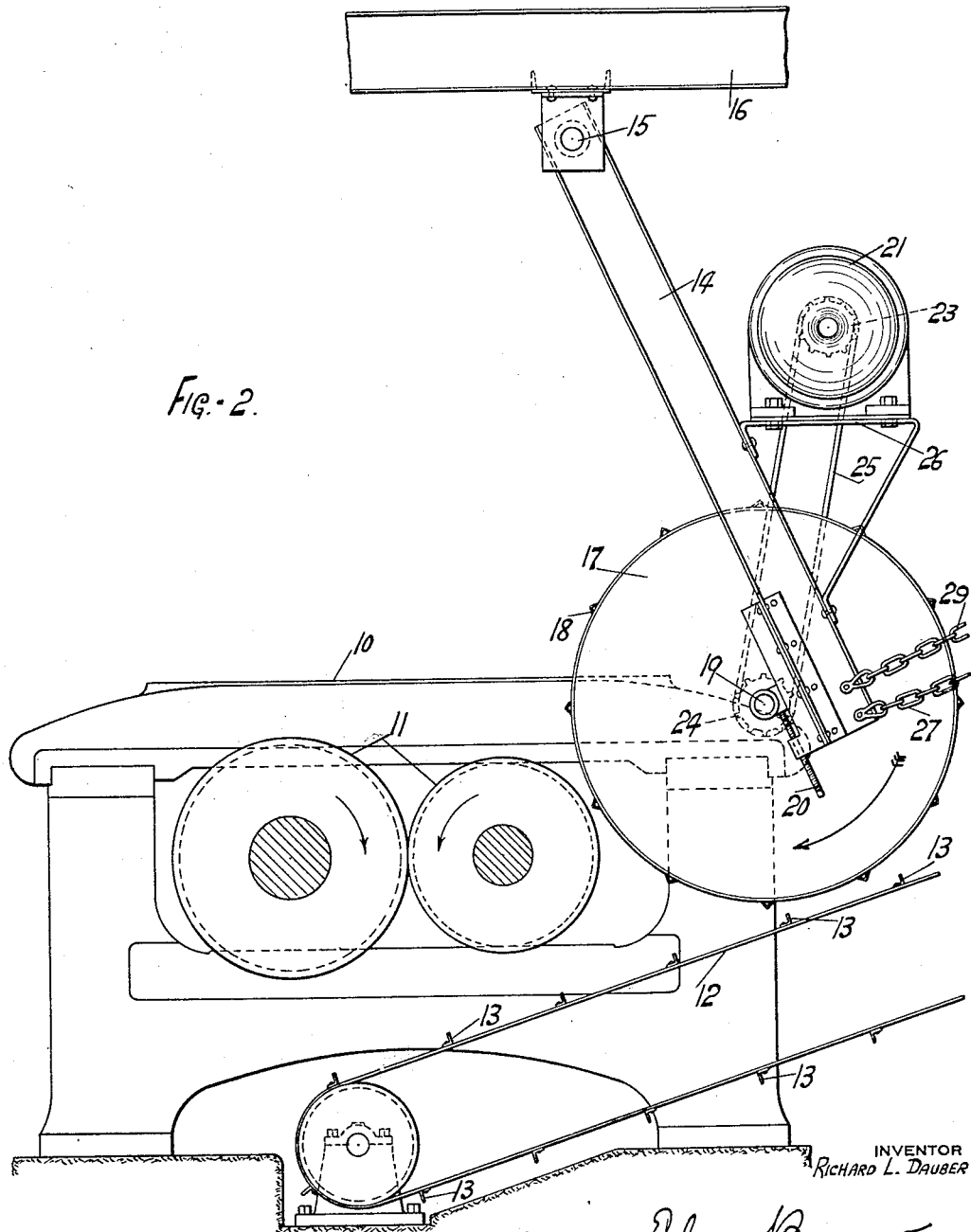
Figure 2 is a vertical sectional view taken on line 2—2 of Figure 1.
Figure 3:
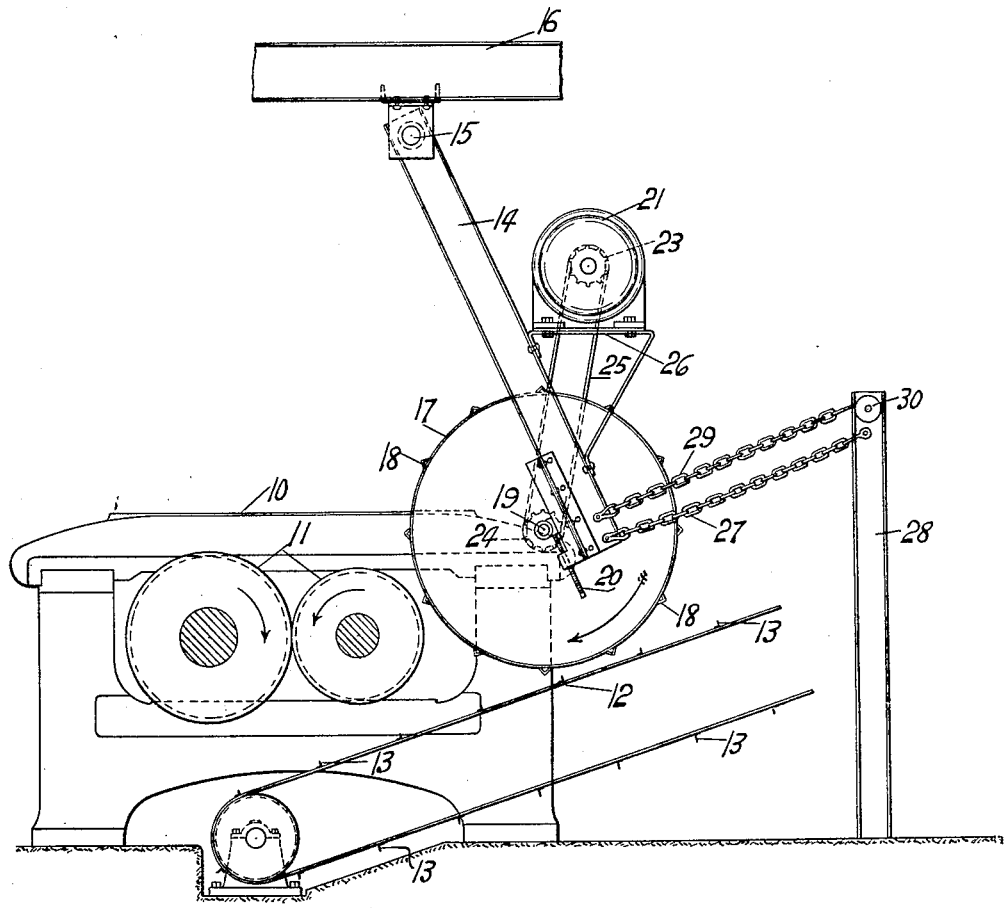
Figure 3 is a view similar to Figure 2, but in addition shows the manner the shock absorbing mechanism is attached to the refeeder.

In the drawings the numeral 10 designates a standard cracker mill having corrugated rollers 11, 11 of different size therein. Below the cracker mill is a conveyor 12 which is usually adapted to carry the scrap rubber broken up in the cracker mill 10 to a hogger (not shown) where the rubber pieces are further reduced in size. Angles 13 may be utilized in the conveyor belt to assist in positively carrying the rubber particles.

The refeeding device comprises a pair of channel irons 14—14 pivotally connected as at 15—15 to a suitable support 16. A drum 17 having a plurality of angles 18 fixed thereto is journaled in bearings 19 mounted on the lower ends of the channel irons 14. Screws 20 are provided to adjust the relative position of the drum bearings 19 and the channels 14.

The drum 17 is adapted to be rotated in the direction shown in the arrow through the agency of suitable means such as an electric motor 21, operating through a reduction gear unit 22 and sprockets 23, 24 and chain 25. A platform 26 is provided to support the motor and reduction unit on the channels 14.

The weight of the refeeding device normally tends to force the drum 17 against the back roll 11 of the cracker mill 10, however, chains 27 are connected between fixed supports 28 and the channels 14 to limit the inward movement of the drum 17.

In addition to the one pair of chains 27 positively limiting the inward movement of the drum, a second pair of chains 29 is provided to resiliently limit the inward movement. The chains 29 are connected to the supports 28 by suitable resilient means such as snubbers 30 so that the chains 29 are shorter than the chains 27 and normally resiliently limit the inward movement of the drum.

In the operation of the apparatus scrap rubber stock of all sorts such as pneumatic tires, solid tires, air bags, inner tubes, etc. after having the metal removed therefrom is fed into the cracker mill 10 where the corrugated rolls 11 turning in the direction indicated by the arrows at different surface speeds break up the scrap rubber. The rubber pieces fall on the conveyor 12 which carries them under the drum 17. The distance the drum 17 is above the conveyor 12 has been previously adjusted by the screws 20 so that pieces of rubber below a certain size pass on up the conveyor while pieces exceeding that size are carried back up on top of the rolls, passing between drum 17 and the revolving back roll 11. Upon passing through the rolls again the pieces are very probably so reduced in size to pass up the conveyor, however, if they are not yet so reduced, the drum 17 in cooperation with the back roll will again return them to the rolls 11. The weight of the refeeder unit normally holds it down against the action of the snubber 30, however, large pieces of rubber returning to the rolls pass between the back roll and the drum 17, thus causing the refeeder to swing about the pivots 15. As soon as the large pieces of rubber have passed the refeeder unit it will swing back down by its own weight at which time the chain 29 and snubber 30 will resiliently limit its movement.

It will be seen that by adjusting the position of the drum above the conveyor the size of the rubber pieces delivered from the cracker mill can be controlled.

Although the refeeding mechanism is particularly adaptable to scrap rubber cracker mills, it will be evident that the invention can be employed in other refeeding relations. It will also be evident that the invention is not limited to the exact form thereof shown and described, accordingly various applications and modifications of the invention can be resorted to without departing from the spirit of the invention or the scope of the appended claims.

What is claimed is:

1. In combination, a cracker mill including a pair of rolls, a conveyor extending under said mill and adapted to receive the material passed through said mill, a frame pivotally supported by its upper end above said mill and conveyor, a drum journaled at the lower end of said frame so that it is immediately above said conveyor and behind one of the rolls in said mill, means for rotating the drum in the opposite direction from the travel of the conveyor to return any large pieces of material to the mill between the drum and said roll, means to resiliently position the drum and frame in relation with the mill and conveyor, and means for adjusting the bearings of said drum with respect to said frame to vary the distance between said drum and said conveyor.

2. In combination, a cracker mill including a pair of rolls, a conveyor extending under said mill and adapted to receive the material passed through said mill, a frame pivotally supported by its upper end above said mill and conveyor, a drum journaled at the lower end of said frame so that it is immediately above said conveyor and behind one of the rolls in said mill, means for rotating the drum in the opposite direction from the travel of the conveyor to return any large pieces of material to the mill between the drum and said roll, and means to resiliently position the drum and frame in relation with the mill and conveyor.

3. In combination, a cracker mill including a pair of rolls, a conveyor extending under said mill and adapted to receive the material passed through said mill, a frame pivotally supported by its upper end above said mill and conveyor, a drum journaled at the lower end of said frame so that it is immediately above said conveyor and behind one of the rolls in said mill, and means for rotating the drum in the opposite direction from the travel of the conveyor to return any large pieces of material to the mill between the drum and said roll.

4. In combination, a cracker mill including a pair of rolls, a conveyor extending under said mill and adapted to receive the material passed through said mill, a drum rotatably mounted above said conveyor and behind one of the rolls in said mill, means for rotating the drum in the opposite direction from the travel of the conveyor to return any large pieces of material to the mill between the drum and said roll, and means to resiliently position the drum in relation with the mill and conveyor.

5. In combination, a cracker mill including a pair of rolls, a conveyor extending under said mill and adapted to receive the material passed through said mill, a drum rotatably mounted above said conveyor and behind one of the rolls in said mill, and means for rotating the drum in the opposite direction from the travel of the conveyor to return any large pieces of material to the mill between the drum and said roll.

6. In combination, a cracker mill including a pair of rolls, a conveyor extending under said mill and adapted to receive the material passed through said mill, a drum rotatably mounted above said conveyor and behind one of the rolls in said mill, means for rotating the drum in the opposite direction from the travel of the conveyor to return any large pieces of material to the mill between the drum and said roll, and means for adjusting the position of said drum with respect to said conveyor.

7. In a refeeding device, a mill comprising a pair of rolls, a conveyor passing under said mill and adapted to receive the material from said mill, a frame, the upper end of said frame being pivotally supported to rotate about an axis parallel to the axes of the mill rolls, a drum journaled on the lower end of said frame, the axis of said drum being parallel with the axes of the mill rolls, said resilient means operating against the weight of said drum and frame, said drum and said conveyor having means on the surfaces thereof to assist in positively engaging with the material, means to rotate said drum in a direction opposite to the movement of the conveyor, said drum and the adjacent mill roll cooperating to return pieces of the material above a desired size to the mills, and adjusting means to vary the distance of said drum above said conveyor to control the size of the pieces of material passing from the apparatus.

8. In a refeeding device, a mill comprising a pair of rotatable rolls, a conveyor passing under said mill and adapted to receive the material from said mill, a drum journaled above the surface of said conveyor and behind the surface of one of said mill rolls, and means to rotate said drum in a direction opposite to the movement of said mill roll, said drum and said mill roll cooperating to return pieces of the material above a desired size to the mill.

9. In a refeeding device, a mill comprising a pair of rolls, a conveyor passing under said mill and adapted to receive the material from said mill, a frame, the upper end of said frame being pivotally supported to rotate about an axis parallel to the axes of the mill rolls, a drum journaled on the lower end of said frame, the axis of said drum being parallel with the axes of the mill rolls, means for resiliently positioning the periphery of said drum just above the surface of said conveyor and just behind the surface of one of said mill rolls, said resilient means operating against the weight of said drum and frame, and means to rotate said drum in a direction opposite to the movement of the conveyor, said drum and the adjacent mill roll cooperating to return pieces of the material above a desired size to the mill.

10. In a refeeding device, a mill comprising a pair of rotatable rolls, a conveyor passing under said mill and adapted to receive the material from said mill, a drum journaled above the surface of said conveyor and behind the surface of one of said mill rolls, and means to rotate said drum in a direction opposite to the movement of said mill roll, said drum and said mill roll cooperating to return pieces of the material above a desired size to the mill.

11. In a refeeding device, a mill comprising a pair of rotatable rolls, a conveyor passing under said mill and adapted to receive the material from said mill, a rotatably mounted drum, the axis of said drum being parallel with the axes of the mill rolls, the periphery of said drum being just above the surface of said conveyor and just behind the surface of one of said mill rolls, and means to rotate said drum in a direction opposite to the movements of the conveyor and of said mill roll, said drum and said roll cooperating to return pieces of the material above a desired size to the mill.

12. In a refeeding device, a mill comprising a pair of rotatable rolls, a conveyor passing under said mill and adapted to receive the material from said mill, a rotatably mounted drum positioned above the surface of said conveyor and behind the surface of one of said mill rolls, and means to rotate said drum in a direction opposite to the movements of the conveyor and of said roll, said drum and said roll cooperating to return pieces of the material above a desired size to the mill.

RICHARD L. DAUBER.